United States Patent [19]
Bonnebat et al.

[11] Patent Number: 4,987,020
[45] Date of Patent: Jan. 22, 1991

[54] HIGHLY ORIENTED THERMOTROPIC MAGNETIC RECORDING MEDIUM

[75] Inventors: Claude Bonnebat, Pontault-Combault; Jean-Pierre Quentin, Lyons; Alain Morin, Villeurbanne, all of France

[73] Assignee: Rhone-Poulenc Chimie, Courbevoie, France

[21] Appl. No.: 418,964

[22] Filed: Oct. 10, 1989

Related U.S. Application Data

[63] Continuation-in-part of Ser. No. 102, 479, Sep. 29, 1987, abandoned.

[30] Foreign Application Priority Data

Sep. 29, 1986 [FR] France .................. 86 13714

[51] Int. Cl.$^5$ ............................................. G11B 23/00
[52] U.S. Cl. ...................................... 428/64; 428/480; 428/694; 428/900; 528/190; 528/191
[58] Field of Search ................. 428/64, 480, 694, 900, 428/65; 427/129; 528/190, 191

[56] References Cited

U.S. PATENT DOCUMENTS

| 4,248,995 | 2/1981 | Fayolle | 528/171 |
| 4,284,757 | 8/1981 | Fayolle | 528/191 |
| 4,311,824 | 1/1982 | Fayolle | 528/190 |
| 4,355,133 | 10/1982 | East et al. | 524/604 |
| 4,652,479 | 3/1987 | Suzuki et al. | 428/64 |
| 4,680,211 | 7/1987 | Evans et al. | 428/64 |
| 4,719,171 | 1/1988 | Ikenaga et al. | 428/65 |

Primary Examiner—Paul J. Thibodeau
Attorney, Agent, or Firm—Sherman and Shalloway

[57] ABSTRACT

Smooth, thin, dimensionally stable, essentially circular and planar injection-molded disc members, well adapted as substrates for magnetic recording discs, e.g., by providing same with an effective recording amount of a magnetic coating material on at least one of the face surfaces thereof, comprise a radially molecularly oriented thermotropic polymer, desirably having a flow temperature ranging from 200° C. to 350° C. and an inherent viscosity of at least 1 dl g$^{-1}$.

10 Claims, 1 Drawing Sheet

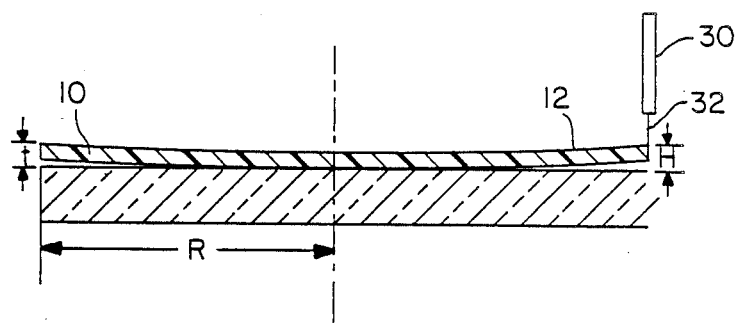

HIGHLY ORIENTED THERMOTROPIC MAGNETIC RECORDING MEDIUM

This is a continuation-in-part application of prior application Ser. No. 102,479, filed Sept. 29, 1987, now abandoned.

BACKGROUND OF THE INVENTION

1. Field of the Invention

The present invention relates to rigid polymeric substrates based on thermotropic polymers well adapted for use as magnetic recording media, and, in particular, to magnetic recording discs produced therefrom.

2. Description of the Prior Art

As is well known to this art, magnetic recording discs include a circular, rigid substrate which is smooth and thin (thickness on the order of 1 to 2 mm), which generally has a coaxial opening in the center thereof, adapted to receive appropriate holding and driving means, and with at least one of its face surfaces comprising a suitable magnetic coating of very low thickness (for example, 0.3 to 0.5 $\mu$m in the case of the magnetic layers based on magnetic pigments or 0.05 to 0.2 $\mu$m in the case of discs provided with a thin metal surface layer).

Surmounting the magnetic coating, one or more magnetic read-write heads are arranged in a manner known per se and, when the disc is rotated (speed of rotation on the order of 3,600 revolutions/minute), these "hover" at a height on the order of 0.2 to 0.6 $\mu$m above the surface of the disc.

To ensure that the position of the head relative to the disc is perfectly stable, the substrate defining a part of this disc's construction has to meet a certain number of requirements, the principal among which are the following:

(a) a high rigidity (reflected particularly in a high modulus of elasticity) to avoid the phenomenon of buckling under the influence of stresses;

(b) an excellent surface quality (reflected particularly in low roughness);

(c) a high dimensional stability with regard to temperature or moisture (reflected particularly in a low coefficient of thermal expansion in the radial direction);

(d) a low moment of inertia (reflected particularly in a low value of relative density); and (e) good chemical and thermal behavior (reflected particularly in a high value of the deformation temperature under load (abbreviated to: DTUL), in order that, when the magnetic coating deposition operations are carried out, it readily withstands, on the one hand, contact with the solvents or solvent mixtures which are employed when a dispersion of magnetic particles are to be deposited (in the case of magnetic layers based on magnetic pigments) and, on the other hand, the high temperatures reached either at the time of deposition (in the case of thin metal layers), or at the time of crosslinking of the binders (in the case of layers based on magnetic pigments).

Aluminum alloys such as, for example, alloys based on aluminum (96% by weight) and magnesium (4% by weight) of the AA 5086 type meet these various requirements relatively well. They are, however, materials which are costly to machine or to polish. Furthermore, iron-rich oxidizable intermetallic compounds are generally present within these materials, giving rise to the formation of segregated regions, the size of which ranges from 2 to 10 $\mu$m, and which behave differently either over the course of the machining and polishing, or during aging.

Glass can also constitute a material which is relatively well adapted as a magnetic coating substrate for a recording disc. However, the disadvantages which are attributed to glass in the majority of cases are as follows: firstly, glass is brittle (in materials science, brittleness typically connotes the absence of plasticity and abrupt failure upon impacts); furthermore, glass is costly to work and to polish; and, lastly, problems may also arise in respect of the adhesion of the magnetic coating which it is to receive.

Because of the high price of the aluminum substrate to the overall cost of manufacture of a rigid magnetic disc (on the order of 30%), as well as the additional cost associated with the need to protect the surface of the substrate with an anti-corrosion layer (for example, a deposit of electrolytic nickel in the case of a disc provided with a thin magnetic layer, and also because of the many disadvantages associated with glass, it has been necessary to investigate other materials which are of greater interest for the production of rigid magnetic disc substrates. The advent of novel thermoplastic polymers with advantageous properties and the use of injection molding in the audiovisual field have resulted in consideration being given to the replacement of aluminum and glass with an appropriate polymer. These are generally inexpensive materials which are very light and which therefore have a low moment of inertia. However, it is quite difficult to provide the combination of the following desirable properties in the case of the circular substrates fabricated from these polymeric materials:

(i) a high modulus of elasticity in the radial direction, preferably well above 5,000 MPa (measured at an EH of 50% and at 25° C. according to French Standard NF T51034);

(ii) a low coefficient of thermal expansion in the radial direction, comparable or even lower than that corresponding to aluminum, which is on the order of 30 $\mu$m/m/°C.;

(iii) a high DTUL of at least 150° C., in order, for example, to enable the coated disc to be readily transferred through a heated oven with the objective of crosslinking the binder present in the magnetizable material which is deposited thereon;

(iv) a very low and preferably nonexistent shrinkage on demolding;

(v) a good resistance to chemical agents in order that the polymeric substrate is not attacked, for example, by the solvents which may be used in the preparation of the liquid dispersion containing the magnetizable material which is deposited onto the support; and (vi) resistance to change due to atmospheric agents, such as moisture, under service conditions which otherwise could result in dimensional changes which are equal to or greater than those effected by a temperature differential.

It should also be noted that difficulties may still be encountered when the polymer is injection molded, if no precautions are taken to initially select a material which is highly fluid in melt form. The difficulties which are encountered using viscous materials may give rise to internal stresses which will be translated into surface defects in the finished substrate and will cause buckling, inherent in thin-walled injection-molded viscous materials.

To date, acceptable polymeric substrates appear to have been produced (cf. the periodical *Plastics Technology*, April 1985, pages 73 et seq.), using:

(1) polyetherimides such as, for example, the material marketed under the trademark Ultem 1000; however, this polymer has a low rigidity reflected in an elasticity modulus of approximately 3,000 MPa, and a high coefficient of thermal expansion in the radial direction, of approximately 56 μm/m/°C., which makes it incompatible with all of the existing tracking systems for rigid discs comprising an aluminum substrate; and (2) polycarbonates or acrylic polymers (cf. JA-A-59/231,750), but both of these materials have an excessively limited temperature behavior.

BRIEF DESCRIPTION OF THE DRAWING

The figure is a schematic view, in elevation, showing the technique for measuring warp angle of the invention molded substrate.

SUMMARY OF THE INVENTION

Accordingly, a major object of the present invention is the provision of an improved rigid magnetic recording substrate based on a polymer:

(i) adapted for ready conversion by injection molding techniques;

(ii) that contributes the advantages of plastics to the finished substrate, especially excellent surface quality, lightness and low production cost; and (iii) that makes it possible to eliminate at least the two disadvantages of low rigidity and excessively high coefficient of thermal expansion.

While the addition of fillers is a known technique for correcting the natural values of plastics with regard to rigidity (when it is too low) and the coefficient of thermal expansion (when it is excessively high), the use of fillers must be avoided in molding rigid plastic substrates, since their presence can play a role which is detrimental to surface quality.

Furthermore, the modulus of elasticity of thermoplastic materials may be increased by monoaxial or biaxial drawing, but these processes are inapplicable in the case of a rigid circular substrate which must meet certain criteria of flatness and of uniformity of thickness.

Consistent with the present invention, a known polymeric material is used, the advantages of which have not been fully realized for the production of substrate destined for use in the manufacture of rigid magnetic recording discs. Such polymeric material exhibits particular intrinsic characteristics which are advantageously and unexpectedly combined under the influence of the conversion conditions in order to impart the desirable properties discussed above.

Briefly, the present invention features a smooth, thin, circular, rigid substrate shaped from a particular polymeric material, for a magnetic recording disc, said polymeric material comprising a thermotropic polymer and having a flow temperature ranging from 200° C. to 350° C. and an inherent viscosity of at least 1 dl g$^{-1}$.

During its preparation, the substrate according to this invention is subjected to a very high molecular orientation by injection molding the thermotropic polymer into a suitable mold cavity equipped with a central injection system for the polymeric material, and wherein the temperature of the walls of said mold ranges from 100° C. to 200° C., the temperature of the injected molten polymer ranges from 280° C. to 350° C., the injection time ranges from 2 to 10 seconds, the injection pressure ranges from 80 to 160 MPa and the holding pressure after injection ranges from 40 to 120 MPa.

The final product molded substrate has a relative density of less than 1.8, a modulus of elasticity in the radial direction ranging from 9,000 MPa to 18,000 MPa, a coefficient of thermal expansion in the radial direction ranging from 10 to 20 μm/m/°C. and a deformation temperature under load of at least 150° C. The final product molded substrate is also characterized by its substantially perfectly smooth surface as measured by a surface roughness of less than 0.05 m and by a planarity such that the angle of buckling (warm angle) is less than $1 \times 10^{-5}$ radian.

DETAILED DESCRIPTION OF THE PREFERRED EMBODIMENTS OF THE INVENTION

More particularly according to the present invention, under the conversion conditions a natural orientation develops and this, because of the inlet feed at the center, or axis, of the article, is generated in a favorable and plane-isotropic manner in the case of a circularly symmetrical geometry to produce a structure which has the desired properties.

Typically, the molded circular substrates which are produced have the following principal dimensions: external diameter: from 70 mm to 360 mm; thickness: from 1 mm to 2 mm. The formats which usually are of greatest interest, being the most widely employed, are the following: substrates having diameters of 90 mm (3½inches) to 130 mm (5¼inches), thus enabling the production of discs having a storage capacity ranging from 5 to 16 megabytes; substrates having a diameter of 200 mm (8 inches) for the manufacture of discs used in microcomputers capable of attaining storage capacities from 10 to 50 megabytes with stacks of several stationary discs; substrates having a diameter of 355 mm (14 inches) intended for stationary disc units of very high capacity.

The thermotropic polymers which are suitable for use according to the present invention comprise wholly aromatic polyesters, alkylaromatic polyesters, wholly aromatic poly(esteramides), alkylaromatic poly(esteramides), aromatic polyazomethines, aromatic carbonate polyesters and mixtures of such polymers.

In a preferred embodiment of the present invention, the thermotropic polymers are wholly aromatic polyesters, alkylaromatic polyesters, aromatic carbonate polyesters and mixtures of these polymers. The wholly aromatic polyesters are especially preferred.

Representative wholly aromatic polyesters which are thermotropic, namely, which are adapted to form anisotropic melts, are described, for example, in U.S. Pat. Nos. 3,991,013, 3,991,014, 4,066,620, 4,075,262, 4,118,372, 4,130,545, 4,181,792, 4,188,476, 4,219,461, 4,224,433, 4,230,817 and 4,346,208, and in European Patent Application No. 86/420,013.4, published under No. 0,191,705.

Representative alkylaromatic polyesters which are thermotropic are described, for example, in U. S. Pat. Nos. 3,778,410, 3,804,805, 4,248,995, 4,311,824 and 4,355,133.

Representative carbonate polyesters which are thermotropic are described, for example, in U. S. Pat. Nos. 4,107,143, 4,284,757 and 4,371,660.

The thermotropic polymers which are advantageously selected according to the present invention are those which have a flow temperature in the range of from 200° C. to 350° C. and which have an inherent viscosity of at least 1 dl g$^{-1}$, and more preferably from 1.1 to 4.0 dl g$^{-1}$. By "flow temperature" is intended the temperature at which the edges of a test specimen in the shape of a polymer chip or of a cut fiber begin to become rounded. This temperature is determined by visual inspection of the test specimen on a glass slidecover at a suitable rate of temperature increase, generally on the order of 10° C. to 20° C. per minute, the observation being made with the aid of a microscope fitted with a heated stage known commercially under the trademark Thermopan. With regard to the inherent viscosity, it is measured at 25° C. on a solution containing 0.5 g of polymer per 100 cm$^3$ of a solvent mixture of para-chlorophenol and 1,2-dichloroethane (50/50 by volume).

The wholly aromatic thermotropic polyesters which are most especially preferred according to the present invention are those described in European Patent Application No. 86/420,013.4, published under No. 0,191,705. These polyesters have the following characterizing features:

(i) they comprise recurring units of the formulae (I), and, if desired, (II), (III) and (IV);

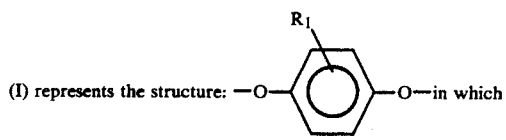

(I) represents the structure: —O—⟨ring R$_1$⟩—O— in which

R$_1$ is a methyl or ethyl radical or a chlorine or bromine atom, with the proviso that the units (I) may either be identical or different;

(II) represents the structure:

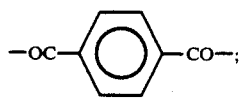

—OC—⟨ring⟩—CO—;

(III) represents the structure:

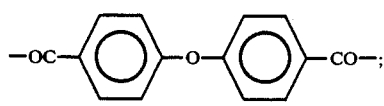

—OC—⟨ring⟩—O—⟨ring⟩—CO—;

(IV) represents the structure:

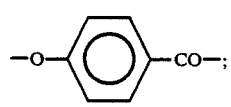

—O—⟨ring⟩—CO—;

(ii) the molar ratio of the recurring units (I) relative to the sum of the recurring units (II)+(III) ranges from 0.95 to 1.05;

(iii) the quantity of recurring units (II) in the mixture (II)+(III) ranges from 0 to 70 mole % and that of the recurring units (III), relative to the same mixture, ranges from 100 to 30 mole %;

(iv) the quantity of recurring units (IV), relative to the quantity of the recurring units (I), ranges from 10 to 300 mole %.

These especially preferred wholly aromatic polyesters also include polymers whose structures may additionally contain aromatic units which form ester groups (dioxy units and/or dicarbonyl units and/or mixed oxy/carbonyl units) having a structure other than those of the recurring units (I), (II), (III) and (IV), the total quantity of these additional units not exceeding 10 mole % relative to the quantity of the recurring units (I). Exemplary of such additional recurring units are the following:

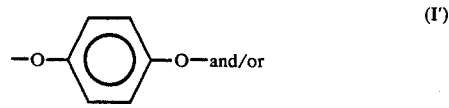
(I')

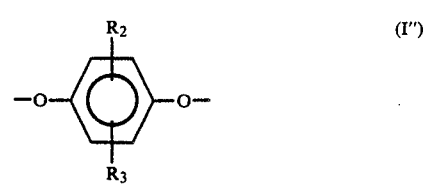
(I")

wherein R$_2$ and R$_3$, which may be identical or different, each have the definition given above for R$_1$, with the proviso that the recurring units (I") may either be identical or different, and/or

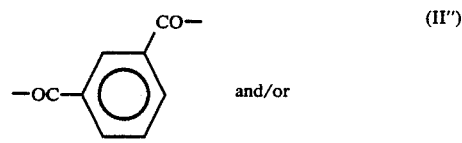
(II")

and/or

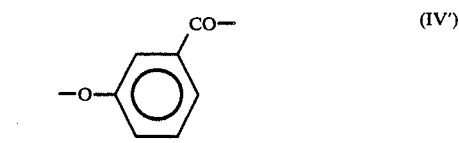
(IV')

The alkylaromatic thermotropic polyesters which are most especially preferred are those described in U. S. Pat. Nos. 4,248,995 and 4,311,824. These polyesters include recurring units of the formulae:

(V) (—O—X$_1$—O—)$_a$ (—O—X$_2$—O—)$_b$ (—O—X$_3$—O—)$_c$ (VI) —CO—Y—CO—

(VII) —CO—Z—CO— in which:

X$_1$ is a 1,4-phenylene radical monosubstituted by a methyl or ethyl group or a chlorine or bromine atom, X$_2$ an unsubstituted 1,4-phenylene radical, X$_3$ is a 1,4-phenylene radical disubstituted by two methyl or ethyl groups or 2 chlorine or bromine atoms, or a 4,4'-diphenylene radical or p,p'-diphenylene ether in which each aromatic nucleus may be substituted by a methyl or ethyl group or a chlorine or bromine atom, with $0.4 \leq a \leq 1$
$0 \leq b \leq 0.6$
$0 \leq c \leq 0.1$ and a+b+c=1, Y is:

- a 1,4-phenylene or 1,4-cyclohexylene radical, or a radical containing two phenylene groups linked together by a single chemical bond or an acyclic chain capable of containing up to 8 carbon atoms and, if desired, 1 or 2 hetero atoms, or
- a divalent aromatic radical containing at least two condensed phenyl nuclei in which the bonds linked to the carbonyl groups are opposite and parallel;

Z is a $-(CH_2)_n-$ radical wherein $3 \leq n = 10$; and the molar ratio $Z/Y+Z$ ranges from 20 to 50%.

The thermotropic carbonate polyesters which are most especially preferred are those described in U. S. Pat. No. 4,284,757. These polyesters include recurring units of the formulae:

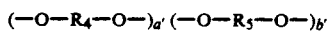

   (IX)

   (X)

in which:

the radicals $R_4$, which are identical, are each a 1,4-phenylene radical monosubstituted by a methyl or ethyl group or a chlorine or bromine atom;

the radicals $R_5$ are each an unsubstituted 1,4-phenylene radical;

with $0.3 \leq a' \leq 1$; $0 \leq b' \leq 0.7$; and $a'+b'=1$;

the radicals $R_6$, which may be identical or different, are each 1,4-phenylene, 1,4-cyclohexylene, 4,4'-biphenylene, 2,6-naphthylene, 4,4'-ethylenedioxy-1,1'-diphenylene, 4,4'-butylenedioxy-1,1'-diphenylene or 4,4'-hexylendioxy-1,1'-diphenylene radicals; and the quantity of the recurring units (IX) in the mixture of (IX) and (X) ranging from 30 to 90 mole %; and the molar ratio of the recurring units (VIII) relative to the sum of the recurring units (IX)+(X) ranging from 0.95 and 1.05.

The thin, circular, rigid substrates according to the present invention are produced by an injection molding process effected in the anisotropy region of the thermotropic polymer employed. It will be appreciated that the thermotropy is easy to demonstrate when the polymer in melt form is observed in an optical system equipped with two crossed polarizers (90° C.): birefringence and transmission of polarized light through the crossed polarizers occurs in the case of the anisotropic specimens. Demonstration of the anisotropy of the polyesters according to the present invention has been carried out using the TOT thermooptical method described in French Patent No. 2,270,282. By "anisotropy region" is intended the temperature range which begins with the temperature at which the birefringence and the transmission of light through the two crossed polarizers appear, and which is situated above said temperature, a range which has a variable upper limit and in which the molten mass is anisotropic without any risk of polymer decomposition. In general, the anisotropic molten masses which are injection-molded according to the present invention have an anisotropy region extending over at least 30° C.

More particularly, the substrates according to this invention are produced by injecting, using apparatus which is per se known to this art, the anisotropic molten mass into a circular mold, the geometric characteristics of which are adapted to the desired dimensions of the ultimate substrates and which is equipped with a system permitting central or axial injection of the polymeric material. As examples of the mold dimensions, the following principal characteristics are representative: external diameter from 77 mm to 360 mm; thickness: 1 to 2 mm. The operating conditions enabling production of substrates according to this invention are those indicated above, that is to say: mold wall temperature: 100° C. to 200° C.; temperature of the molten polymer: 280° C. to 350° C.; injection time: 2 to 10 seconds; injection pressure: 80 MPa to 160 MPa; holding pressure: 40 MPa to 120 MPa.

The molded circular substrates which are produced have a low relative density of less than 1.8 and display the combination of the desired properties More precisely, they have a modulus of elasticity in the radial direction ranging from 9,000 MPa to 18,000 MPa and a coefficient of thermal expansion in the radial direction which is less than 30 μm/m/°C. and which, as indicated above, preferably ranges from 10 to 20 μm/m/°C. Conversely, the coefficient of thermal expansion in the transverse direction ($a_t$) will generally and preferably exceed 100 μm/m/°C., such as from 100 to 250 μm/m/°C. Preferably, the ratio $a_r/a_t$ which is a measure of the anisotropy in depth is less than about 0.1. The advantages of the molded substrates which are produced are not restricted to these two properties; it should be noted, in particular, that these materials also have a high DTUL, of at least 150° C., and which can attain values up to 240° C. and even higher, and good dimensional stability with low degree of shrinkage on demolding and that, insofar as physicochemical properties are concerned, they are naturally insensitive to solvents and are only slightly moisture-sensitive. Furthermore, the anisotropic melts employed in the injection-molding operations are characterized by very high fluidity when heated, and this makes it possible to produce shaped articles exhibiting an excellent surface profile. More precisely, the molded substrates produced are perfectly smooth (surface roughness is less than 0.05 μm) and have perfect planarity and uniformity of their thickness. By virtue of the injection molding from a central injection port and under the specified molding conditions using the particular thermotropic polymers, it has become possible to greatly control shrinkage forces in the radial direction which tend to form during cooling of the molded substrate. By controlling variable radial shrinkage forces during cooling, warping of the substrate is substantially eliminated such that in the non-etched portions of the substrate, the substrate surface is substantially perfectly planar. As used herein "substantially perfectly planar" or "perfect planarity" is defined as an angle of buckling (warp angle) (defined as the ratio H/R, for a circular molded substrate, where H is the vertical distance between a point on the top surface of the substrate, at the periphery of the substrate and a perfectly smooth marble or glass-like reference surface on which the center of the circular substrate is held, and R is the radius of the substrate measured in the same units as H; see FIG. 1) which is less than $1 \times 10^{-5}$ radian.

After the molding operation and before or after demolding, the substrates produced may be subjected to a heat treatment at a high temperature, but below the melting point of the polymer. After demolding and cooling, the substrates produced are subjected to the conventional treatment intended to produce (or to apply a final finish to) the central aperture, and then they are provided with a magnetic coating on at least one of the face surfaces thereof, after a preliminary degreasing of the surface(s) involved.

Thus, the present invention also features magnetic recording discs resulting from the magnetic coating of the molded substrates which have been described above.

More particularly, this invention also features magnetic recording discs comprising a smooth, thin, circular, rigid substrate made of polymeric material and having a magnetic coating of particulate or thin-layer type deposited onto at least one of the face surfaces thereof, wherein said substrate satisfies those requirements given above.

Because of the high resistance of the substrates of this invention towards chemical agents and towards temperature, it is possible to employ all known techniques for the deposit of a magnetic layer or topcoat.

In particular, where a magnetic coating of the particulate type, based on magnetic pigments, is concerned, it is possible to employ the unit coating method known as "spinner" or centrifugal coating, using a nozzle which deposits the magnetic coating by pouring it onto the substrate which is fastened on a rotating tray, whether arranged horizontally or vertically. The magnetic coating layer generally contains magnetic particles which may be, for example, iron oxide ($\gamma$-$Fe_2O_3$ plus $Fe_3O_4$ if desired), doped, if desired, with cobalt, with passivated iron, with iron nitride or with barium hexaferrite, which are dispersed in a suitable solvent or a mixture of solvents and a suitable binder. The magnetic layer may additionally contain a lubricant, as in the traditional Winchester type method. After coating and drying, the coated substrate is subjected to a heat treatment in order to crosslink the binder, this treatment being carried out, for example, at about 200° C. when the binder employed is an epoxy resin. However, other means of crosslinking may be utilized, depending on the nature of the binder: for example, a radiation or electron beam treatment. After this crosslinking stage, the magnetic disc produced is subjected to conventional polishing and cleaning operations. The thickness of the deposited layer based on magnetic pigments generally ranges from 0.3 to 5 $\mu$m, depending on the type of application for which the disc is intended. It should be noted that the disc may be coated with a thin lubricating layer before use.

Another deposition technique which can be employed, this time in order to produce a magnetic coating of the thin-layer type, includes thermally evaporating, by a thermal route or by cathodic sputtering, a metal composition based on cobalt, chromium, nickel or alloys thereof. This technique may be followed, where appropriate, by the deposition of an anti-corrosion layer and/or of a protective layer (based on alumina, for example) or a lubricating layer (based on carbon, for example). The thickness of the deposited metal layer typically ranges from 0.05 to 0.2 $\mu$m, depending on the type of application for which the disc is intended.

An alternative embodiment includes deposition of the magnetic layer by means of an electrolytic method, provided the substrate has first been metallized.

It should be noted that the final product magnetic discs exhibit the combination of desirable properties referred to above in respect of the substrate, especially insofar as the surface quality (roughness, flatness), rigidity (elasticity modulus), dimensional stability (thermal expansion coefficient) and heat resistance (DTUL) are concerned.

In order to further illustrate the present invention and the advantages thereof, the following specific examples are given, it being understood that same are intended only as illustrative and in nowise limitative.

EXAMPLE 1:

This example illustrates production of a thin, circular, rigid substrate according to the present invention.

1. Description of the thermotropic polymer employed

A wholly aromatic polyester was prepared, of the type described in European Patent Application No. 86/420,013.4, published under No. 0,191,705.

The following reactants and catalysts were introduced into a 7.5-liter polycondensation reactor which was stirred and heated by means of a heat transfer fluid circulating in the reactor jacket and equipped with a device for distillation and for purging with an inert gas:

| | | |
|---|---|---|
| (1) | chlorohydroquinone diacetate: [molar ratio (1)/(2) + (3) = 1]; | 1028 g |
| (2) | terephthalic acid: [50 mole % in the mixture of (2) + (3)]; | 373 g |
| (3) | di(4-carboxyphenyl) ether: [50 mole % in the mixture of (2) + (3)]; | 581 g |
| (4) | para-acetoxybenzoic acid: [34 mole % based on (1)]; | 275.5 g |
| (5) | magnesium acetate: [500 ppm]. | 1.13 g |

The reactor was purged with nitrogen and was then heated with the heat transfer fluid, having a temperature of 260° C., for 2 hours and 20 minutes. The volume of acetic acid which was distilled off was 506 cm$^3$ (i.e., 83% of theory). The temperature of the metal bath was then gradually raised to 330° C. over 40 minutes, while the pressure was reduced at the same time from $1,010 \times 10^2$ Pa to $0.39 \times 10^2$ Pa. After the distillation of acetic acid had stopped, the temperature was maintained at 330° C. and the pressure at $0.39 \times 10^2$ for 12 minutes, 30 seconds. The total volume of acetic acid collected was 602 cm$^3$ (i.e., 100% of theory).

The polymer produced was greyish and fibrous in appearance. It had an inherent viscosity of 1.4 dl g$^{-1}$. Its flow temperature was 290° C. The anisotropy region ranged from 290° C. to above 350° C.

2. Injection molding of the substrate

The polymer was processed on a Battenfeld BSKM 100/70 S DS 2,000 injection molding machine. The circular mold employed, having polished face surfaces, had the following characteristics: diameter: 95 mm±0.025 mm; thickness: 2 mm±0.025 mm; central injection via a 4-mm diameter nozzle.

The molding conditions were as follows:

| | |
|---|---|
| (i) Temperature of the mold faces: | 130° C., |
| (ii) Temperature of the polymer melt: | 320° C., |
| (iii) Injection time: | 2.5 seconds, |
| (iv) Injection pressure: | 120 MPa, |
| (v) Holding pressure: | 90 MPa. |

3. Machining of the substrate

After demolding and cooling, a coaxial central hole 25 mm in diameter was cut in the substrate.

4. Properties of the molded substrate

(a) Surface quality (1) Surface roughness: 0.02 μm;
(2) pseudosinusoidal planarity defect: period 50 μm; amplitude: 0.2 to 0.4 μm.

[These characteristics were established using a Taylor-Hobson instrument known as Talystep under the following conditions: static touch sensor: tip radius: 0.013 mm, the vertical motion of the sensor being amplified electronically; sensor contact load: set at 50 mg; signal interruption frequency: 0.76 mm; sensitivity: 20 angstroms. The surface roughness is the average value of the dimensional difference in peaks and valleys over a surface length distance of 1 micron. The pseudosinusoidal planarity defect is the average value of the dimensional difference of the peaks and valleys for several sweeps of the sensor taken at different locations over the surface of the substrate, each sweep being taken over a surface length distance of 50 microns.]

(3) Warp Angle: $0.7 \times 10^{-5}$ radian.

The warp angle is measured (see FIG. 1) by securing the substrate 10 on top of a perfectly smooth reference plane 20 (having a marble-like surface). The distance H between the plate top 22 and substrate top surface 12 at the periphery thereof is obtained by a differential measurement using a transducer 30 with an inductive gauge tip 32 (a Millitron 1202D available from Feinpruf Mahr was used), taking the thickness of the substrate into consideration.

The warp angle is taken as the average of 10 measurements made on each of 3 different substrates, the 10 measurements being made at 10 equidistant points on the periphery, i.e. at a spacing of 36°.

(4) Shrinkage on demolding: none.

(b) Mechanical properties

The determination of mechanical properties was carried out using test specimens taken radially (in the direction of flow) and transversely (in the transverse direction) from the molded substrate produced:

Tensile properties

The moduli and the strength were measured at 23° C. according to French Standard NF T 51034 on dumbbell-shaped test specimens 4 mm in width and 2 mm thick, conditioned at an RH of 50%:

| | |
|---|---|
| (i) Radial modulus of elasticity (Mr): | 12,700 MPa, |
| (ii) Transverse modulus of elasticity ($M_t$): | 6,600 MPa, |
| (iii) Radial tensile strength: | 100 MPa, |
| (iv) Elongation at break: | 3%. |

Coefficient of thermal expansion

The dimensional stability of the substrate was evaluated by means of measurements of the coefficient of linear thermal expansion on parallelepipedal test specimens $5 \times 5 \times 2$ mm in size, taken radially ($\alpha r$) and transversely ($\alpha_t$) according to ASTM Standard D 696-70 in a temperature range from $-30°$ C. to $+30°$ C. and under dry nitrogen:

| | |
|---|---|
| $\alpha r$: | 14 μm/m/°C., |
| $\alpha_t$: | 180 μm/m/°C. |

The deformation temperature under load was measured according to French Standard NF T 51005; its value was 250° C. (under 1.82 MPa).

(c) Physicochemical properties

Relative density: $d = 1.45$
Crystallinity: the structure was semicrystalline.

Solvent resistance: excellent; to evaluate this resistance, 7 test specimens according to French Standard NF T 51034 were immersed in the solvent, heated to a given temperature for a given time, and the mean radial tensile strength of the 7 test specimens was measured after this time. The solvent resistance was considered to be excellent when the tensile strength was reduced to a value which still represented at least 90% of the initial value.

| Solvents and test conditions: | Tensile strength: % of the initial strength |
|---|---|
| Trichloroethylene; 7 days at 50° C. | 100% |
| 37% $H_2SO_4$; 7 days at 50° C. | 90% |
| 20% $H_2SO_4$; 30 days at 50° C. | 100% |
| 20% HCl; 30 days at 50° C. | 97% |

Water uptake: below 100 ppm; to measure this, the procedure was as given below: a test specimen according to French Standard NF T 51034 was dried at 150° C. for 3 hours, was weighed ($w_o$) and was then immersed in water at 23° C. for 48 hours; after this time period, the test specimen was removed from the water, its surface was wiped dry and it was reweighed (w): the water uptake is equal to $w - w_o/w_o \times 10^6$.

5. Anisotropy

Planar anisotropy of mechanical properties: this reflects the ratio $Mr/M_t$, which was equal to $12,700/6,600 = 1.92$.

Anisotropy in depth: this reflects the ratio $\alpha r/\alpha t$, which was equal to $14/180 = 0.077$.

For comparison purposes, the molding operation of Example 1 was repeated using the same thermotropic polymer as used in Example 1 and using the same injection molding machine as used in Example 1 with the same circular mold and central injection port, except that the molding conditions of mold temperature, injection time and injection pressure where varied as shown in the following Table 1. Also shown in Table 1 are the measurements of surface roughness and warp angle measured in the same way as in Example 1.

TABLE 1

| TEST | Temperature of cold (°C.) | Injection time (seconds) | Injection pressure (MPa) | Warp Angle (Radian) | Surface Roughness (μm) |
|---|---|---|---|---|---|
| Example 1 | 130 | 2.5 | 90 | $0.7 \times 10^{-5}$ | 0.03 |
| A | 80 | 2.5 | 90 | $3 \times 10^{-5}$ | a |
| B | 40 | 2.5 | 60 | $50 \times 10^{-5}$ | a |

TABLE 1-continued

| TEST | Temperature of cold (°C.) | Injection time (seconds) | Injection pressure (MPa) | Warp Angle (Radian) | Surface Roughness (μm) |
|---|---|---|---|---|---|
| C | 130 | 2.5 | 20 | $5 \times 10^{-5}$ | a |
| D | 130 | 15 | 90 | $0.9 \times 10^{-5}$ | >1 |
| E | 130 | 0.8 | 100 | $3.5 \times 10^{-5}$ | a | a: not measured

From Test A, it is seen that where the temperature of the mold surface is below the minimum lower limit of 100° C., namely at 80° C., the warp angle is increased to $3 \times 10^{-5}$ radian. At a mold temperature of 40° C. as in Test B, the warp angle becomes as high as $50 \times 10^{-5}$ radian, even when the pressure is reduced to 60 Mpa.

Test C shows that when the applied pressure during molding is below the lower limit of 40 Mpa, namely at 20 Mpa, the warp angle is again as high as $5 \times 10^{-5}$ radian.

Test D and E show the criticality of the duration of the injection molding. In Test D, the injection molding time was 15 seconds and the warp angle was $0.9 \times 10^{-5}$ radian, while the surface roughness is greater than 1 μm. When the injection molding time is only 0.8 seconds, requiring an increased pressure of 100 Mpa, the warp angle is as high as $3.5 \times 10^{-5}$ radian.

EXAMPLE 2:

This example illustrates production of a magnetic disc according to the present invention, comprising a magnetic coating based on magnetic pigments.

1. Preparation of the magnetic coating mixture

This was prepared by dispersing a cobalt-doped acicular iron oxide, available commercially from Pfizer under the trademark MO 2228 (coercivity: 320 oersted), in a mixture comprising a solvent based on diethylene glycol dimethyl ether (diglyme) and ethylene glycol and an epoxy resin-based binder system available commercially from Shell under the trademark Epikote 1001, polyvinyl acetal available commercially from Monsanto under the trademark Butvar P 74 and N-aminopiperazine as a hardener The solids content of the dispersion (pigments+binder system) was 30% by weight. The magnetic pigments represented 55% of the weight of the deposited and dry magnetic coating.

2. Coating deposition

The coating mixture described above was then deposited onto the 95-mm diameter substrate obtained according to the procedure of Example 1, using the conventional centrifugal coating method in which the substrate rotated at approximately 300 revolutions/minute, the centrifuging being carried out at 1,200 revolutions/minute.

The coated substrate was treated to evaporate the solvent and was then subjected to a temperature of 190° C. for 4 hours to crosslink the binder resins. The magnetic layer deposited had a thickness of 0.60 μm.

The finished disc produced required only slight polishing on a felt tray, with an alumina dispersion, before being used in a reader-recorder device. It should be noted that, prior to use, the disc was also sprayed with a lubricant consisting of a Freon 113 solution containing 1% by weight of a polyperfluoroether marketed by the Montefluos company under the trademark Fomblin Z.

The disc prepared in this manner had the following principal characteristics: surface roughness: this was less than 0.025 μm; it could readily withstand more than 10,000 start/stop cycles in a reader-recorder; the electrical properties were in accordance with the required values.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A smooth, thin, dimensionally stable, circular, rigid and planar substrate, adapted for receiving on at least one face surface thereof a magnetic coating material to form a magnetic recording medium, said substrate having an external diameter in the range of from about 70 millimeters to 360 millimeters, a thickness in the range of from about 1 to 2 millimeters, a relatively density of less than 1.8, a modulus of elasticity in the radial direction of from about 9000 Mpa to 18000 MPA, a coefficient of thermal expansion in the radial direction of from about 10 to 20 μm/m/°C., and a deformation temperature under load of at least 150° C., and said substrate being formed by injection molding a thermotropic aromatic polyester polymer having a flow temperature ranging from about 200° to 350° C. and an inherent viscosity of at least 1 dl/g in an injection mold fitted with a central injection system under the following molding conditions: (1) temperature of the molten polymer of from 280° C. to 350° C.; (2) injection pressure of from 80 to 160 Mpa; (3) temperature of the mold walls of from 100° C. to 200° C.; (4) an injection time of from 2 to 10 seconds; and (5) a holding pressure after injection of from 40 Mpa to 120 Mpa; whereby said thermotropic polymer is radially molecularly oriented and said substrate is substantially perfectly smooth as reflected in a surface roughness of less than 0.05 micron, and is substantially perfectly planar, as reflected in a warp angle of less than $1 \times 10^{-5}$ radian.

2. The substrate of claim 1 further comprising as effective recording amount of a magnetic coating material on at least one of the face surfaces thereof.

3. The substrate of claim 1 wherein said thermotropic polymer comprises a wholly aromatic polyester, alkylaromatic polyester, wholly aromatic poly(esteramide), alkylaromatic poly(esteramide), aromatic polyazomethine, aromatic carbonate polyester or mixture thereof.

4. The substrate of claim 3 wherein said thermotropic polymer comprises a wholly aromatic polyester, alkylaromatic polyester, aromatic carbonate polyester or mixture thereof.

5. The substrate of claim 4 wherein said thermotropic polymer has an inherent viscosity ranging from 1.1 to 4.0 dl/g.

6. The substrate of claim 2 having the magnetic coating material on both face surfaces thereof.

7. The substrate of claim 1 wherein said thermotropic aromatic polyester polymer is a wholly aromatic polyester polymer.

8. The substrate of claim 1 wherein said wholly aromatic polyester polymer comprises recurring units of the following formulas (I), (III) and (IV) and, optionally (II):

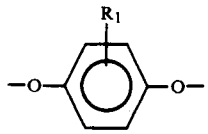
(I)

in which $R_1$ is methyl, ethyl, chlorine or bromine, with the proviso that the units (I) are the same or different;

(II)

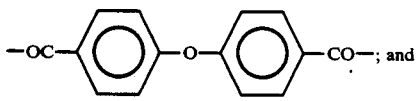
(III)

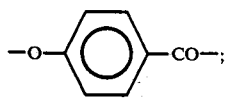
(IV)

wherein the molar ratio of the recurring units (I) relative to the sum of the recurring units (II) and (III) ranges from 0.95/1 to 1.05/1; the quantity of units (II) to the mixture of units (II) and units (III) is from 0 to 70 mole%, and that of units (III), relative to the mixture of units (II) and (III), ranges from 100 to 30 mole%; and the quantity of recurring units (IV), relative to the quantity of units (I), ranges from 10 to 300 mole%.

9. The substrate of claim 1 wherein said thermotropic aromatic polyester polymer is an alkyl aromatic polyester consisting of units of formulae:

$$(-O-X_1-O-)_a\,(-O-X_2-O-)_b$$
$$(-O-X_3-O-)_c \qquad (V)$$

$$-CO-Y-CO- \qquad (VI)$$

and $$-CO-Z-CO- \qquad (VII)$$

in which:

$X_1$ denotes a 1,4-phenylene radical monosubstituted by a methyl or ethyl group or a chlorine or bromine atom, $X_2$ denotes an unsubstituted 1,4-phenylene radical, $X_3$ denotes a 1,4-phenylene radical disubstituted by two methyl or ethyl groups or 2 chlorine or bromine atoms, or a 4,4'-diphenylene radical or p,p'-diphenylene ether in which each aromatic nucleus may be substituted by a methyl or ethyl group or a chlorine or bromine atom, with $0.4 \leq a \leq 1$ $0 \leq b \leq 0.6$ $0 \leq c \leq 0.1$ and $a+b+c=1,$ Y denotes:
a 1,4-phenylene or 1,4-cyclohexylene radical
or a radical containing two phenylene groups linked together by a single bond or an acyclic chain containing up to 8 carbon atoms and, 0, 1 or 2 hereto atoms,
or a divalent aromatic radical containing at least two condensed phenyl nuclei in which the bonds linked to the carbonyl groups are opposite and parallel, and X denotes a $-(CH_2)_n-$ radical with $3 \leq n \leq 10$, and the molar ratio $Z/Y+Z$ being between 20 and 50%.

10. The substrate of claim 1 wherein said thermotropic aromatic polyester is an aromatic carbonate polyester consisting of units of formulae:

$$(-O-R_4-O-)_{a'}\,(-O-R_5-O-)_{b'} \qquad (VIII)$$

(IX)

$$-CO-R_6-CO- \qquad (X)$$

in which:
the radicals $R_4$, which are identical, each denote a 1,4-phenylene radical monosubstituted by a methyl or ethyl group or a chlorine or bromine atom,
the radicals $R_5$ each denote an unsubstituted 1,4-phenylene radical,
with $0.3 \leq a' \leq 1;\ 0 \leq b' \leq 0.7;$ and $a'+b'=1$,
the radicals $R_6$, which may be identical or different, each denote a radical chosen from 1,4-phenylene, 1,4-cyclohexylene, 4,4'-diphenylene, 2,6-naphthylene, 4,4'-ethylenedioxy-1,1'-diphenylene, 4,4'-butylenedioxy-1,1'-diphenylene and 4,4'-hexylenedioxy-1,1'-diphenylene groups; the quantity of the units (IX) in the mixture of (IX) and (X) being between 30 and 90 mole%; and the molar ratio of the units (VIII) in relation to the sum of the units (IX)+(X) being between 0.95 and 1.05.

* * * * *